March 19, 1940.  O. A. CHRISTENSEN  2,193,803
COMPENSATING GEAR
Original Filed June 15, 1932  4 Sheets-Sheet 1
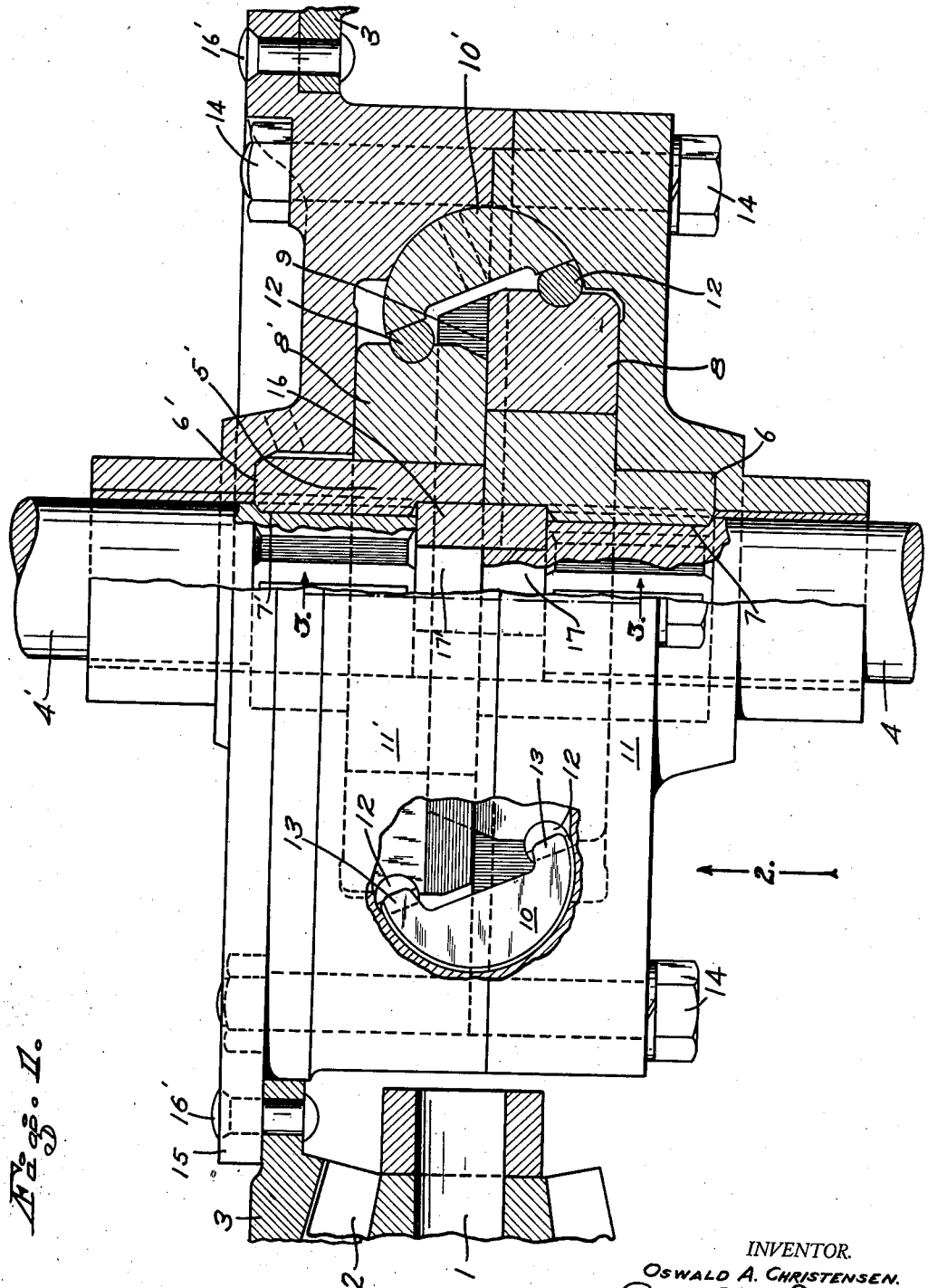
INVENTOR.
OSWALD A. CHRISTENSEN.
BY
ATTORNEYS.

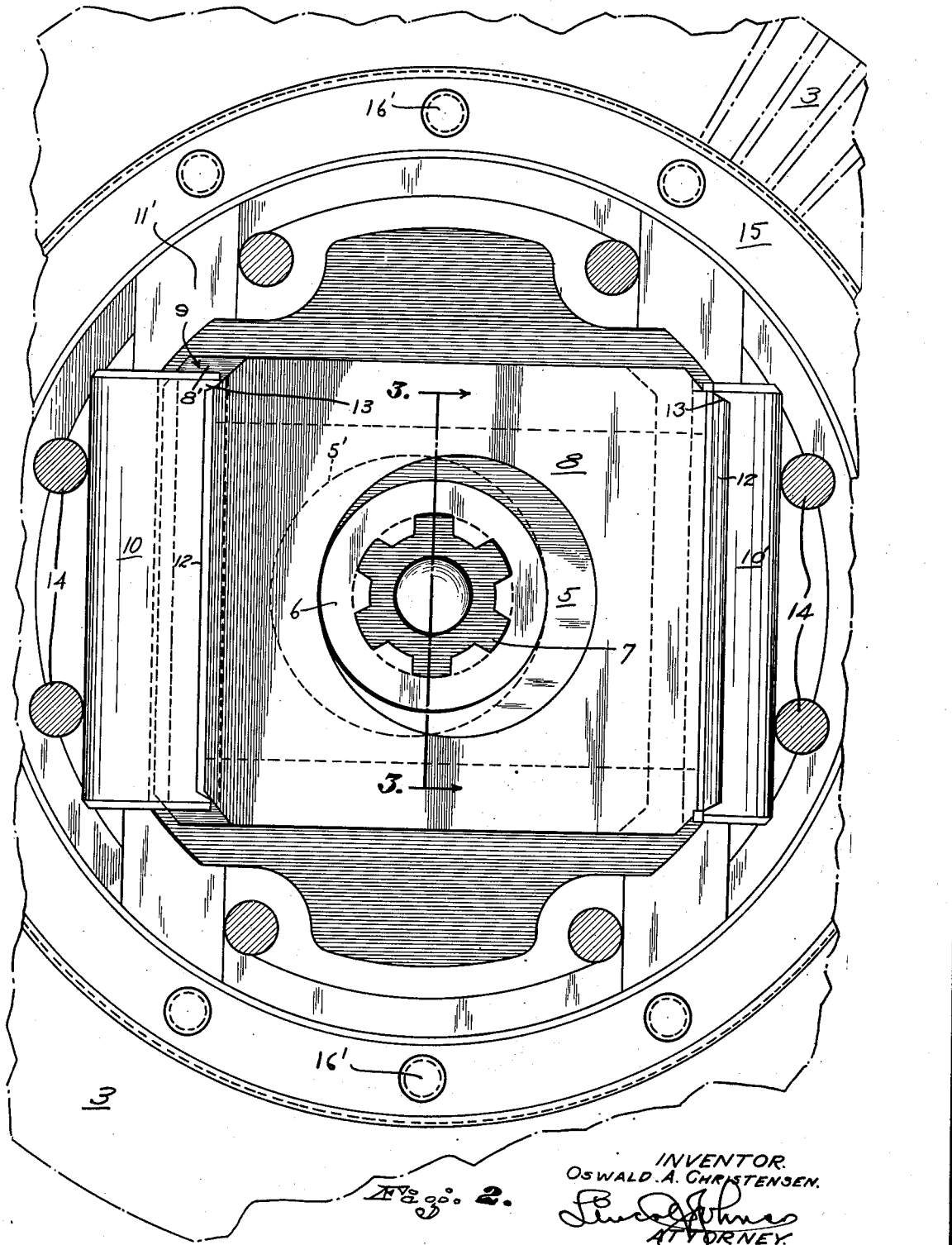

March 19, 1940.  O. A. CHRISTENSEN  2,193,803
COMPENSATING GEAR
Original Filed June 15, 1932  4 Sheets-Sheet 3
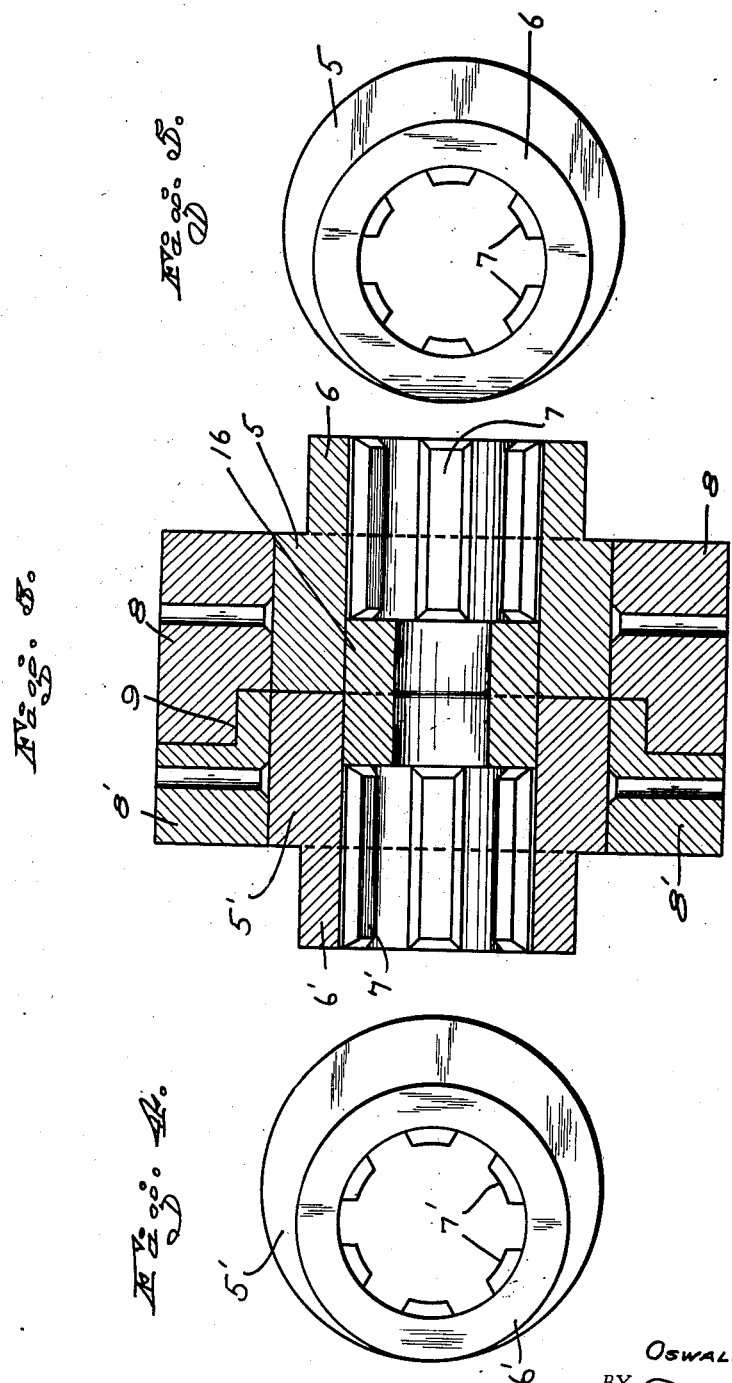
INVENTOR.
OSWALD A. CHRISTENSEN
BY
ATTORNEYS.

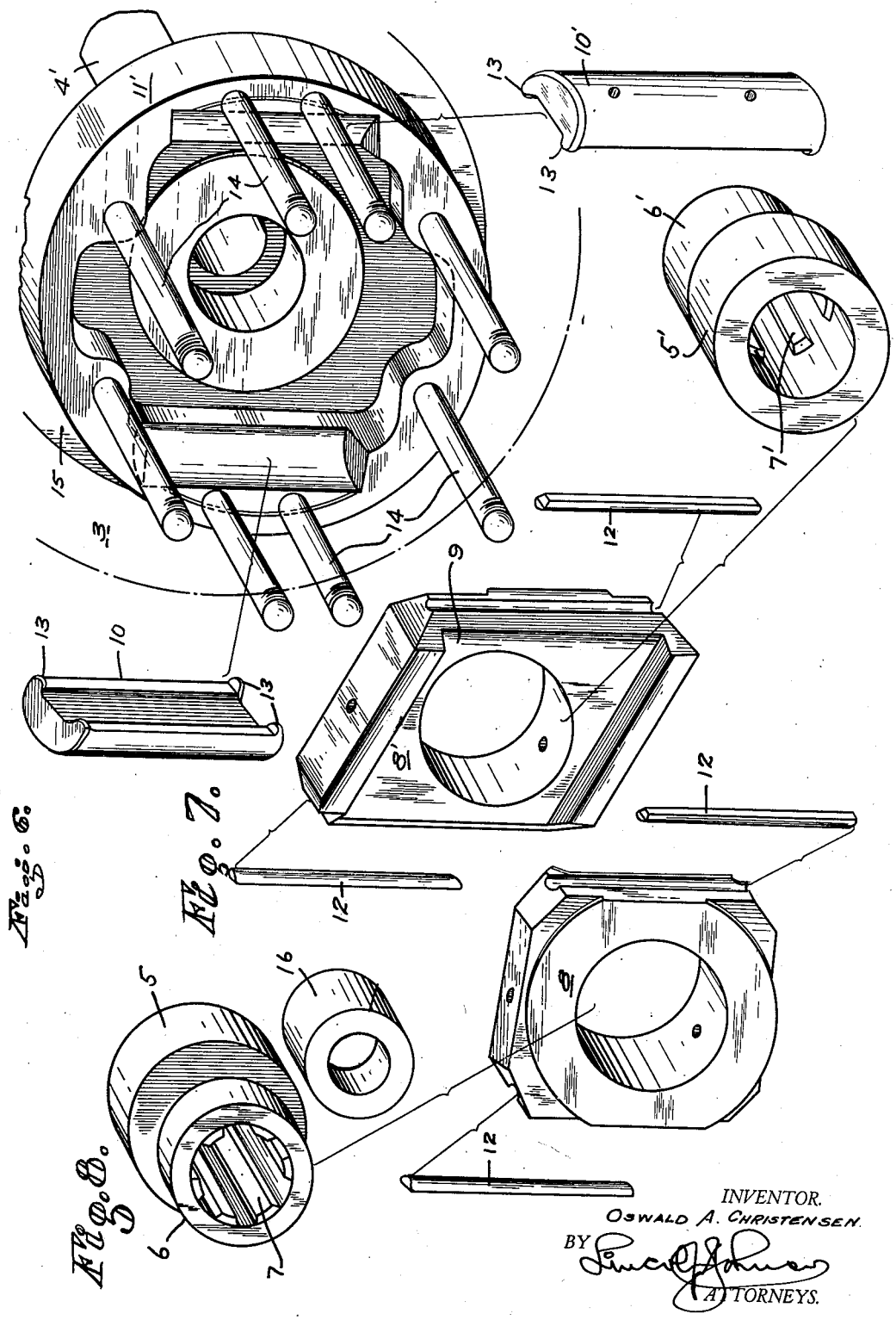

Patented Mar. 19, 1940

2,193,803

UNITED STATES PATENT OFFICE 2,193,803

COMPENSATING GEAR

Oswald A. Christensen, Oakland, Calif.

Refiled for abandoned application Serial No. 617,379, June 15, 1932. This application September 9, 1937, Serial No. 163,098

11 Claims. (Cl. 74—389.5)

This application is a refile of abandoned application Serial No. 617,379, filed June 15, 1932.

My invention relates to differential gearing for driving a pair of axles from a single drive shaft while permitting different or differential speeds between the two axles. In the standard automobile differential the driving torque divides equally to the two driven axles regardless of their relative speeds. My invention relates to differentials in which the driving torque is concentrated on the slowest axle, so that in the case of the automobile it is impossible to spin one rear wheel without driving the other wheel.

The functional superiority of this type of gearing has been recognized for many years and the sole obstacle to its adoption has arisen from the tremendous forces involved. Prior designs have failed to withstand these forces and it therefore has been impossible to apply the advantageous principles of this type of compensating gear in practice. It is the object of my invention to retain all the advantages accruing to this type of differential in a device which is practically operative.

Referring to the drawings:

Fig. 1 is a composite plan and mid-sectional plan view of the compensating gear of my invention in the form designated for automotive use; portions being broken away to disclose the section.

Fig. 2 is a left side elevation of the device with the left half of the housing removed. An arrow 2 in Fig. 1 indicates the direction in which the elevation is viewed.

Fig. 3 is a detail axial section of the two eccentrics assembled on the center plug, and their cooperating followers. With parts in the operative position illustrated in Figs. 1 and 2, Fig. 3 would correspond to the horizontal section indicated by the lines 3—3 of Figs. 1 and 2. Figs. 4 and 5 are respectively right and left end elevations of the sub-assembly of Fig. 3 with the eccentric followers removed.

Fig. 6 is a perspective view of an open half of the spider showing the oscillating levers disassembled therefrom and in bracketed association therewith.

Fig. 7 is a perspective view of one of the followers and its cooperating eccentric, and the bearing shoes to be mounted on the follower, all of said parts being in bracketed disassembled association.

Fig. 8 is a perspective view of the other follower and cooperating eccentric and cooperating bearing shoes, all in bracketed disassembled association.

The drive shaft 1, its pionion 2, the ring gear 3 and the two axles 4 and 4' are equipment standard to the ordinary automobile with which my compensating gear is adapted to be combined, or to which it may form a separately marketable attachment. It is desired to transmit torque from the drive shaft at relatively variable speed to the two axles, to permit compensation or differentiation for turning movement of the automobile. An eccentric 5 is provided for axle 4 (see Figs. 3, 4 and 5), and an identical eccentric 5' is provided for axle 4'. These eccentrics have a concentric hub 6 and 6' and a bore therethrough provided with driving splines 7 or 7' for receiving the splined end of either axle.

Eccentric straps 8 and 8' are provided and constitute followers cooperating with the two eccentrics. These followers are simply massive square blocks suitably beveled for clearance, and bored concentrically to a rotatable fit on the eccentrics. The two followers are splined together at 9 by a key and groove on the mating faces of the followers and are thus restrained against relative rotation about the axes of the axles and constrained to radial motion relative to each other. The followers, though prevented from relative rotation, are free to mutually rotate relative to both eccentrics providing the eccentrics rotate at the proper speeds in a compensating direction. (It is understood of course, that the two axles are rigidly journaled in alignment.)

The mechanical advantage of the eccentrics is so great relative to the coefficient of friction, that no amount of radial pressure on the followers 8, 8' will rotate the axles. By extension of this principle it will be seen that no amount of torque applied to axle 4 will cause axle 4' to rotate relative to the followers, because this torque is converted into radial pressure on the follower 8, is transmitted as such to the follower 8', and as such cannot rotate the eccentric 5'. Conversely no amount of torque applied to axle 4' will cause axle 4 to rotate in the opposite direction. It is true however, that the two axles may be rotated relative to the followers, by an outside force if moved simultaneously at the proper speeds in compensating directions.

As so far described the eccentric followers could be mutually rotated relative to the eccentrics under two conditions; (1) that the eccentrics at all times are aligned; i. e., with their eccentricities pointing the same way; and (2) that the eccentrics always have their eccentricities in or on the same (either) side of, and an equal distance from, a plane containing the axis of rotation (axle axes) and parallel to the tongue and groove splines 9 in the followers. In other words the eccentrics would have to be rotated at the same speed (relative to the followers), (1), in the same direction, or (2), in opposite directions.

In order that the axles may be driven from the followers it is necessary to add a means for preventing the eccentrics from being rotated in the same direction relative to the followers; in other words, to constrain against the freedom described above as condition (1). This has been accomplished by connecting the two followers 8, 8' by means of equalizer levers 10, 10' for equal and opposite relative reciprocation.

Although the followers 8, 8' are constrained against relative rotation they may be mutually rotated by the ring gear 3 through a connection later to be described. When thus rotated, the tendency is for the followers to lock against the eccentrics and rotate both shafts as a unit. Assume that the followers are being rotated at 100 R. P. M., and are driving each axle at 100 R. P. M. No matter what the relative positive load against the two axles, their speeds will remain equal due to the locking action of the eccentrics, even though the load be entirely removed from one axle. As soon however, as a force is applied to one axle, 4' for instance, tending to rotate it faster than 100 R. P. M., say at 105 R. P. M., the eccentrics unlock, and if the followers are still rotated at 100 R. P. M. the speed differential between this axle 4' and the followers is plus 5 R. P. M. This is only possible if an equal and opposite differential of minus 5 R. P. M. exists between the other axle 4 and the followers; that is, if axle 4 rotates at 95 R. P. M. This is precisely the action which occurs when rounding a turn in an automobile. The speed of the outside wheel tends to increase and permits the speed of the inside wheel to be reduced a compensating amount. The compensating effect is the same as occurred when the eccentric followers remained rotatively stationary and external forces were applied to the two axles to rotate them in opposite directions at equal speed relative to the followers. Compensation or differentiation can only occur when opposite (but not necessarily equal) torques are applied to the two axles. Mere removal of load from one axle, as by loss of traction of one auto wheel on a slippery spot, will not cause that wheel to spin.

It will be observed that the eccentrics and their followers are juxtaposed; there being no spider or other mechanism separating the two followers. This feature is especially important as affecting the directness with which the opposed forces may be balnced against each other, thus not only immediately affecting compactness, but also permitting smaller metal sections to balance these directly applied forces.

In respect to the levers it should be noted that they are a reversible linkage in contradistinction to the irreversible eccentric mechanism. By "irreversible" is meant, not that reverse movement is prevented, but that the linkage may be driven from one end only, and any force applied to the other end merely locks the linkage with imposition of considerable strain. Thus, relative motion of either follower in either direction is transmitted directly by the levers into opposite motion of the other follower. Whereas in the eccentric mechanism 5—8, for example, no amount of radial force applied to the follower 8 would turn the eccentric 5.

The levers 10, 10' are simply semi-cylindrical or flat-cylindrical bars having their half-cylindrical surfaces journaled for oscillation in a rugged housing spider 11, 11' encasing the eccentric followers; the bars forming fillers and driving splines between the housing and the followers. The ends of the reciprocating followers 8, 8' abut against opposite abaxial sides of the non-cylindrical faces of the levers 10, 10'. These levers were devised after careful consideration of the duty required of them, and constitute an important feature of my device. They are unique in providing markedly broader bearing area than has heretofore been attained, and in that they are subjected to practically no tensile or shearing stresses.

Angularity of the levers 10, 10' is compensated for by four flattened-cylindrical bearing pins or shoes 12 interposed between the levers and followers. Grooves are formed in the ends of the followers to receive the shoes 12, with their flat faces bearing slidably against the levers 10, 10'. Four tits 13, projecting one from each corner of each lever, retain the shoes in position and limit the mutual reciprocation of the followers 8, 8' to a sliding motion along the rounded surfaces of the pins 12.

The housing 11 is an assembly of a cup-shaped male half 11 and a cup-shaped female half 11' each journaled on one of the axles, and secured together by bolts 14. An annular flange 15 on the female half serves for attachment of the ring gear 3 by rivets 16' as in the standard differential. The housing 11 is in fact analogous to the spider of a standard differential. The journal beds for the levers 10, 10' are formed by quarter-cylindrical concavities in each half of the housing at opposite sides thereof. These concavities have their axes parallel and both said axes are abaxial and non-parallel to the center of rotation of the housing. The space between the opposite semi-cylindrical concavities in the assembled gear is completely filled (by the followers 8, 8' the levers 10, 10' and the pins 12), so that the housing and followers are constrained to mutual rotation. The followers might be considered square nuts being turned by a wrench which corresponds to the housing 11. All the bearing faces are case-hardened. Any wear tending to cause lost motion in these parts may be taken up most simply by one or more oversize pins 12. Of course the cavity in the housing is made large enough to permit the necessary mutual reciprocation of the followers perpendicular to their relative reciprocation (i. e., in a horizontal direction as referred to Fig. 2).

Considerable eccentric reaction is imposed upon the axles, and means is provided to supplement the axle journals of the housing 11 for maintaining rigid alignment of the axles. A cylindrical center plug 16 extends into the axial bore of each eccentric and is in turn bored from each end to receive the reduced ends 17, 17' of the two axles. The center plug constitutes a further means for attaining the compact strength which I consider a paramount object of the present invention.

Attention is directed to the manner in which the strains are taken in every case by structure especially fitted to resist them. Thus the splines 9 and center plug 16 are subjected to pure shearing stress with practically no tension or bending. The levers 10, 10' and thrust blocks 12 are subjected to pure compression. The eccentric followers 8, 8' are stressed principally in compression. The tensile stresses are taken almost entirely by the rugged housing 11, 11' which is subjected besides to some relatively slight torsional shear. It is especially to be noted in the present design that tensile and compressive strains are opposed almost directly and cause a minimum of bending stress.

Having thus described this invention, what I claim and desire to secure by Letters Patent is:

1. As a compensating gear in combination with a pair of shafts; an eccentric on each shaft, a cylindrical center plug rotatably engaged with said eccentrics for maintaining the alignment of the shafts; and driving means for said shafts, comprising a mutually rotatable follower for each eccentric, cooperating means thereon constraining said followers against relative rotation about the axes of said shafts, said means comprising interengaging complementary means on opposed faces of said followers slidably connecting said opposed faces together, and means connecting said followers for opposite relative oscillation, said last-included means being reversible in the sense that movement of either follower per se is transmitted to the other follower, whereby jamming of said last-included means is prevented and said last-included means being movable on axes that are fixed relative to the axes of the shafts.

2. As a compensating gear in combination with a pair of shafts; an eccentric on each shaft, a cylindrical center plug rotatably engaged with said eccentrics for maintaining the alignment of the shafts; and driving means for said shafts, comprising a mutually rotatable follower for each eccentric, means cooperating with and between the followers to permit and constrain them to a relative translation thereof, said means comprising interengaging complementary means on opposed faces of said followers slidably connecting said opposed faces together, and means remote from the shafts but fixed relative thereto, and connecting said followers for opposite relative reciprocation.

3. As a compensating gear in combination with a pair of shafts; an eccentric on each shaft, a cylindrical center plug rotatably engaged with said eccentrics for maintaining the alignment of the shafts; and driving means for said shafts, comprising a mutually rotatable follower for each eccentric, means constraining said followers against relative rotation about the axes of said shafts, said means comprising interengaging complementary means on opposed faces of said followers slidably connecting said opposed faces together, and means including a lever connecting said followers for opposite relative oscillation, and having its fulcrum fixedly related to the axis of said shafts.

4. As a compensating gear in combination with a pair of shafts; an eccentric on each shaft, a cylindrical center plug rotatably engaged with said eccentrics for maintaining the alignment of the shafts; and driving means for said shafts, comprising a mutually rotatable follower for each eccentric, cooperating means thereon constraining said followers against relative rotation about the axes of said shafts, said means comprising interengaging complementary means on opposed faces of said followers slidably connecting said opposed faces together, and a pair of levers connecting said followers for opposite relative oscillation, the fulcrum of each lever being fixedly related to the axis of said shafts.

5. As a compensating gear in combination with a pair of shafts, a driving spider rotatable about a fixed axis, an eccentric on each shaft, a cylindrical center plug rotatably engaged with said eccentrics for maintaining the alignment of the shafts, a follower for each eccentric, means cooperative with and between said followers to permit and constrain them to reciprocative relative translation thereof, said means comprising interengaging complementary means on opposed faces of said followers slidably connecting said opposed faces together, and means including a lever fulcrumed in said spider at a fixed point relative to the shaft axis and connecting said followers for opposite relative reciprocation; said followers being constrained to mutual rotation with said spider.

6. As a compensating gear in combination with a pair of shafts, a driving spider rotatable about a fixed axis, an eccentric on each shaft, a cylindrical center plug rotatably engaged with said eccentrics for maintaining the alignment of the shafts, a follower for each eccentric, means constraining said followers against relative rotation about the axes of said shafts, said means comprising interengaging complementary means on opposed faces of said followers slidably connecting said opposed faces together, and means including a lever fulcrumed at a fixed point relative to said spider and at an angle to said axes and connecting said followers for opposite relative oscillation; said followers being constrained to mutual rotation with said spider.

7. As a compensating gear in combination with a pair of shafts; an eccentric on each shaft, a cylindrical center plug rotatably engaged with said eccentrics for maintaining the alignment of the shafts, a follower for each eccentric, means constraining said followers against relative rotation about the axes of said shafts, said means comprising interengaging complementary means on opposed faces of said followers slidably connecting said opposed faces together, a spider encasing and mutually rotatable with said followers, and a pair of bars forming levers each having a cylindrical side fulcrumed in said spider at opposite ends of said followers and each having a flat side connecting said followers for opposite relative oscillation.

8. As a compensating gear in combination with a pair of shafts; an eccentric on each shaft, a cylindrical center plug rotatably engaged with said eccentrics for maintaining the alignment of the shafts, a follower for each eccentric, means constraining said followers against relative rotation about the axes of said shafts, said means comprising interengaging complementary means on opposed faces of said followers slidably connecting said opposed faces together, a spider encasing and mutually rotatable with said followers, and a pair of bars fulcrumed parallel to their axes at fixed points with respect to said spider and at opposite ends of said followers, one of said followers being positioned to bear upon said bars parallel to and at one side of their fulcrums and the other follower being positioned to bear upon said bars parallel to and at the other side of their fulcrums, whereby said bars constitute levers connecting said followers for opposite relative oscillation.

9. As a compensating gear in combination with a pair of shafts, an eccentric on each shaft, a follower for each eccentric, means constraining said followers against relative rotation about the axes of said shafts, a spider encasing and mutually rotatable with said followers, a pair of bars forming levers each having a cylindrical side fulcrumed in said spider at opposite ends of said followers and each having a flat side connecting said followers for opposite relative oscillation, and pins forming pivotal bearing shoes interposed between said levers and followers, each of said pins having a cylindrical side engaging the follower and a flat side engaging the lever.

10. A compensating gear for connecting a pair of aligned shafts, comprising a pair of juxtaposed eccentrics one on each shaft, a follower for each eccentric, a pair of opposed thrust levers connecting said followers for opposite oscillation, the axes of said levers being fixed to the axes of the shafts, and a cylindrical center plug rotatably engaged with said eccentrics for maintaining the alignment of the shafts.

11. In a compensating gearing for connecting a pair of shafts, a rotatable eccentric for each shaft, a cylindrical center plug rotatably engaged with said eccentrics for maintaining the alignment of the shafts, a follower for each eccentric, means cooperative between the followers for constraining them against relative rotation about the axes of said shafts and permitting their relative reciprocation, said means comprising interengaging complementary means on opposed faces of said followers slidably connecting said opposed faces together, a driving spider, a pair of opposed levers fulcrumed in said spider at fixed points relative to the axis of the shafts and cooperatively and constantly engaging opposed portions of said followers for effecting said relative reciprocation of the followers, and cooperating means on said levers and followers for permitting a like and guided movement of said followers transversely of the line of relative reciprocation thereof and in a fixed path with respect to said spider.

OSWALD A. CHRISTENSEN.